(12) United States Patent
Dollase et al.

(10) Patent No.: US 8,129,470 B2
(45) Date of Patent: *Mar. 6, 2012

(54) ADHESIVE MASSES BASED ON BLOCK COPOLYMERS OF STRUCTURE P(A)-P(B)-P(A) AND P(B)-P(A)-P(B)

(75) Inventors: Thilo Dollase, Hamburg (DE); Marc Husemann, Hamburg (DE); Bernd Luhmann, Norderstedt (DE)

(73) Assignee: tesa AG, Hamburg (DE)

( * ) Notice: Subject to any disclaimer, the term of this patent is extended or adjusted under 35 U.S.C. 154(b) by 703 days.

This patent is subject to a terminal disclaimer.

(21) Appl. No.: 10/529,845

(22) PCT Filed: Mar. 4, 2002

(86) PCT No.: PCT/EP02/02309

§ 371 (c)(1),
(2), (4) Date: Oct. 24, 2005

(87) PCT Pub. No.: WO03/000794

PCT Pub. Date: Jan. 3, 2003

(65) Prior Publication Data

US 2006/0235150 A1 Oct. 19, 2006

(30) Foreign Application Priority Data

Jun. 20, 2001 (DE) .................................. 101 29 608

(51) Int. Cl.
*C09J 153/00* (2006.01)
*C08L 53/00* (2006.01)

(52) U.S. Cl. ........................................................ 525/89
(58) Field of Classification Search ...................... 525/89
See application file for complete search history.

(56) References Cited

U.S. PATENT DOCUMENTS

| | | | |
|---|---|---|---|
| 3,239,478 A | 3/1966 | Harlan | 260/27 |
| 3,468,972 A | 9/1969 | Hsieh | 260/836 |
| 3,595,941 A | 7/1971 | Farrar et al. | 260/879 |
| 3,935,338 A | 1/1976 | Robertson | 427/207 |
| 4,377,655 A | 3/1983 | Himes | 524/313 |
| 4,581,429 A | 4/1986 | Solomon et al. | 526/220 |
| 4,673,714 A * | 6/1987 | Kishimoto et al. | 525/314 |
| 5,073,611 A | 12/1991 | Rehmer et al. | 526/208 |
| 5,143,972 A | 9/1992 | Groves | 525/71 |
| 5,194,455 A | 3/1993 | Massow et al. | 522/152 |
| H1251 H | 11/1993 | Southwick | 524/272 |
| 5,284,916 A | 2/1994 | Drzewinski | 525/92 |
| 5,292,795 A | 3/1994 | Southwick et al. | 524/562 |
| 5,314,962 A | 5/1994 | Otsu et al. | 525/280 |
| 5,403,658 A | 4/1995 | Southwick et al. | 428/355 |
| 5,627,234 A | 5/1997 | Giordano et al. | 525/89 |
| 5,741,543 A | 4/1998 | Winslow et al. | 427/208.4 |
| 5,789,487 A | 8/1998 | Matyjaszewski et al. | 525/301 |
| 5,851,664 A | 12/1998 | Bennett et al. | 428/355 |
| 5,854,364 A | 12/1998 | Senninger et al. | 526/192 |
| 5,945,491 A | 8/1999 | Matyjaszewski et al. | 526/111 |
| 6,093,410 A * | 7/2000 | Peffly et al. | 424/401 |
| 6,096,435 A | 8/2000 | Maekawa et al. | 428/462 |
| 6,432,475 B1 | 8/2002 | Yamamoto et al. | 427/208.4 |
| 6,703,441 B2 * | 3/2004 | Husemann et al. | 524/558 |
| 6,723,407 B2 * | 4/2004 | Dollase et al. | 428/40.1 |
| 6,734,256 B1 | 5/2004 | Everaerts et al. | 525/299 |
| 7,067,581 B2 * | 6/2006 | Husemann et al. | 524/558 |
| 2003/0037857 A1* | 2/2003 | Burdon et al. | 156/89.11 |
| 2004/0034124 A1 | 2/2004 | Court et al. | 523/400 |

FOREIGN PATENT DOCUMENTS

| | | |
|---|---|---|
| DE | 27 43 979 A1 | 4/1979 |
| DE | 199 49 352 A1 | 4/2000 |
| DE | 101 29 608 | 5/2003 |
| DE | 101 56 088 | 6/2003 |
| EP | 0 343 467 B1 | 5/1989 |
| EP | 0 451 920 B1 | 10/1991 |
| EP | 0 457 566 | 11/1991 |
| EP | 0 590 723 | 4/1994 |
| EP | 0 683 187 | 11/1995 |
| EP | 0 735 052 A1 | 10/1996 |
| EP | 0 824 110 A1 | 2/1998 |
| EP | 0 824 111 A1 | 2/1998 |
| EP | 0 826 698 A1 | 3/1998 |
| EP | 0 841 346 A1 | 5/1998 |
| EP | 0 850 957 A1 | 7/1998 |
| EP | 0 863 184 | 9/1998 |
| EP | 0 921 170 A1 | 6/1999 |
| EP | 1 008 640 | 6/2000 |
| JP | 10025460 * | 1/1998 |
| WO | WO 96/24620 | 8/1996 |
| WO | WO 96/35725 | 11/1996 |
| WO | WO 98/01478 | 1/1998 |
| WO | WO 98/13392 A1 | 4/1998 |
| WO | WO 98/44008 A1 | 10/1998 |
| WO | WO 99/31144 | 6/1999 |
| WO | WO 00/12645 | 3/2000 |
| WO | WO 00/39233 | 7/2000 |
| WO | WO 01/92415 | 12/2001 |

OTHER PUBLICATIONS

Derwent Acc-No. 1998-154169, abstracting JP 10-025460, Jan. 1998.*
Fukuoka, electronic translation specification of JP 10-025460, Jan. 1998.*
T. G. Fox, Bull. Am. Phys. Soc. 1 (1956) 123.
Macromolecules, 1995, 28, 7886.
Macromolecules 2000, 33, 243-245.
Synth. Comm., 1988, 18 (3), 1531.

* cited by examiner

*Primary Examiner* — Jeffrey Mullis
(74) *Attorney, Agent, or Firm* — Norris McLaughlin & Marcus, P.A.

(57) ABSTRACT

A pressure-sensitive adhesive comprising a blend of at least two components, one of which comprises a block copolymer having at least the unit P(A1)-P(B1)-P(A1) and the second of which comprises a block copolymer having at least the unit P(B2)-P(A2)-P(B2); the blend forming an at least two-phase system.

15 Claims, No Drawings

ADHESIVE MASSES BASED ON BLOCK COPOLYMERS OF STRUCTURE P(A)-P(B)-P(A) AND P(B)-P(A)-P(B)

This is a 371 of PCT/EP02/02309 filed 4 Mar. 2002 (international filing date).

The invention relates to pressure-sensitive adhesives (PSAs) based on block copolymers of the general type P(A)-P(B)-P(A) and P(B)-P(A)-P(B).

BACKGROUND OF THE INVENTION

Within the field of PSAs, continuing technological developments in the coating technique mean that there is an ongoing need for new developments. In industry, hotmelt processes with solventless coating technology are of increasing importance in the preparation of PSAs, since the environmental regulations are becoming ever more stringent and the prices of solvents continue to rise. Consequently solvents are to be eliminated as far as possible from the manufacturing operation for PSA tapes. The associated introduction of the hotmelt technology is imposing ever greater requirements on the adhesives. Acrylic PSAs in particular are the subject of very intensive investigations aimed at improvements. For high-level industrial applications polyacrylates are frequently preferred over other adhesive systems on account of their transparency and weathering stability. In addition to these advantages, however, these acrylic PSAs must also meet stringent requirements in respect of shear strength and bond strength. This profile of requirements is matched by polyacrylates of high molecular weight and high polarity with subsequent efficient crosslinking. These high shear strength, polar PSAs, however, possess the disadvantage that they are not well suited to the hotmelt extrusion operation: shearing within the extruder may degrade the polymer, with a consequent reduction in molecular weight. This damage significantly reduces the level of the adhesive properties. The shear strengths of the hotmelt-coated acrylic PSAs in particular fall distinctly in comparison to the original, solvent-coated PSA. At the present time, therefore, different concepts aimed at reducing the flow viscosity and thereby facilitating extrusion coating of these PSAs are being investigated.

The industry is pursuing a variety of concepts for achieving this objective. One possibility is the highly efficient crosslinking of a low viscosity, apolar acrylic adhesive not until it is on the backing. Acrylates containing electron-donating groups are copolymerized and, during crosslinking by UV or EBC (EBC: electron beam curing), they stabilize free radicals that are formed. Examples thereof are tertiary amine monomers [WO 96/35725], tertiary butylacrylamide monomer [U.S. Pat. No. 5,194,455], and tetrahydrofuryl acrylates [EP 0 343 467 B1]. A further efficient crosslinking concept is the copolymerization of UV photoinitiators into the polyacrylate chain. For example, benzoin acrylate has been used as a comonomer and the crosslinking has been conducted on the backing using UV light [DE 27 43 979 A1]. In U.S. Pat. No. 5,073,611, on the other hand, benzophenone and acetophenone were used as copolymerizable monomers.

Very efficient chemical crosslinking takes place by radiation in the case of polyacrylates containing double bonds [U.S. Pat. No. 5,741,543].

Styrene-isoprene-styrene (SIS) block copolymers, in contrast, are widespread elastomers for hotmelt processible PSAs [preparation processes: U.S. Pat. Nos. 3,468,972; 3,595,941; application in PSAs: U.S. Pat. Nos. 3,239,478; 3,935,338]. Good processing properties are achieved by virtue of a relatively low molecular weight and by virtue of a specific morphology [EP 0 451 920 B1]. These PSAs can be crosslinked very effectively with UV light in the presence of photoinitiators or with electron beams, since the middle blocks contain a multiplicity of double bonds.

Nevertheless these elastomers possess disadvantages, such as, for example, severe aging under UV light (in other words in daylight as well) and in an atmosphere containing oxygen/ozone. Another property which is very adverse for application is the relatively low thermal shear strength, owing to the use of polystyrene as hard block domain. These PSAs are therefore not suitable for relatively long-term outdoor bonds or for applications in relatively higher temperature ranges. The same is also true of other block copolymers which possess a middle block containing at least one double bond [U.S. Pat. No. 5,851,664].

One solution to the problem of aging, hotmelt processibility, high cohesion, and efficient chemical crosslinking by radiation is provided by the combination of SIS polymers with polyacrylates. Accordingly, US H1,251 describes diene copolymers containing acrylate for hotmelt applications, although these copolymers are likewise subject to aging, owing to the large number of double bonds which remain.

U.S. Pat. No. 5,314,962 describes A-B-A block copolymers as elastomers for adhesives, but these possess only A-domain formation as a cohesion-forming criterion and therefore lack great shear strength, especially at high temperatures.

EP 0 921 170 A1 describes A-B-A block copolymers which are modified with at least 40% resin additions. As a result of the high level of resin addition such PSAs are extremely hard and have virtually no tack. Moreover, the bond strengths as well, particularly on surfaces with a low energy, are lowered sharply.

It is an object of the invention, therefore, to provide improved pressure-sensitive adhesives based on polyacrylate which exhibit the disadvantages of the state of the art only to a reduced extent, if at all, and which therefore achieve adhesive properties, particularly bond strengths, which are improved as compared with conventional pressure-sensitive adhesives based on A-B-A block copolymers (A=hard block; B=polyacrylate and hence elastomer block) without losing the properties which are advantageous for their use as pressure-sensitive adhesives.

SUMMARY OF THE INVENTION

The invention accordingly provides blends of at least two block copolymer components K1 and K2, each block copolymer component being based on at least one block copolymer C1 or C2 respectively, the at least one block copolymer C1 of component K1 comprising at least the unit P(A1)-P(B1)-P(A1), comprising at least one polymer block P(B1) and at least two polymer blocks P(A1), where P(A1) independently at each occurrence represents homopolymer or copolymer blocks of monomers A1, the polymer blocks P(A1) each having a softening temperature in the range from +20° C. to +175° C., P(B1) represents a homopolymer or copolymer block of monomers B1, the polymer block P(B1) having a softening temperature in the range from −130° C. to +10° C., the polymer blocks P(A1) and P(B1) are not homogeneously miscible with one another, the at least one block copolymer C2 of component K2 comprising at least the unit P(B2)-P(A2)-P(B2), comprising at least two polymer blocks P(B2) and at least one polymer block P(A2), where P(A2) represents a homopolymer or copolymer block of monomers A2, the polymer block P(A2) having in each case a softening temperature in the range from +20° C. to +175° C., P(B2) independently at each occurrence represents homopolymer or copolymer blocks of monomers B2, the polymer blocks P(B2) each having a softening temperature in the range from −130° C. to +10° C., the polymer blocks P(A2) and P(B2) are not homogeneously miscible with one another, and the blend forming an at least two-phase system.

In this case, at its most simple, component K1 may consist solely of the block copolymers C1 and/or component K2 may consist solely of the block copolymers C2.

DETAILED DESCRIPTION

The phrase "two-phase system" here includes a system in which there is microphase separation.

In the text below the polymer blocks P(A) are also termed "hard blocks" and the polymer blocks P(B) "elastomer blocks". Here and below A (without index) refers to an (arbitrary) monomer from a first monomers group [group of the monomers A, also simply group G(A)] and B (without index) refers to an (arbitrary) monomer from a second monomers group [group of the monomers B, also simply group G(B)]. The designation A1 refers to the monomers of type A incorporated by copolymerization into the block copolymer C1 and correspondingly B1 refers to the monomers of type B incorporated in C1, A2 to the monomers of type A incorporated into the block copolymer C2, and B2 to monomers of type B in the block copolymer C2. In the case of further polymers (C3, C4. . . ) this designation will be continued logically (A3, B3, A4, B4, . . . ).

In this sense, correspondingly, the hard blocks P(A) here embrace the polymer blocks P(A1) and P(A2), and the elastomer blocks P(B) embrace the polymer blocks P(B1) and P(B2).

Furthermore, below, the block copolymers C1 and C2 containing the unit P(A1)-P(B1)-P(A1) and/or the unit P(B2)-P(A2)-P(B2) are referred to as triblock copolymers, irrespective of whether there are also further radicals or copolymer blocks in this block copolymer and irrespective of what such further radicals or blocks might be. Block copolymers C2 containing the unit P(B2)-P(A2)-P(B2) are also referred to in particular as inverse triblock copolymers.

By softening temperature in this context is meant the glass transition temperature in the case of amorphous systems and the melting temperature in the case of semicrystalline polymers. Glass temperatures (and melting temperatures where appropriate) are stated as results of quasistatic methods [unless indicated otherwise, differential scanning calorimetry (DSC; constant heating rate of 10° C. in 5 min, inert gas atmosphere)]. Block copolymers having incompatible blocks and blends have more than one glass transition temperature, and such temperatures can be determined separately from the measurement plot.

In advantageous embodiments of the invention the block copolymers C1 and C2 used may have further structural features. These can be described, for example, by the following general formulae:

P(B)-P(A)-P(B)-P(A)-P(B)     (I)

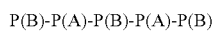     (II)

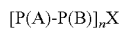     (III)

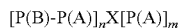     (IV), where n=3 to 12, m=3 to 12, and X is a polyfunctional branching unit, i.e., a chemical structural element via which two or more polymer arms are linked to one another, where the polymer blocks P(A) independently at each occurrence represent homopolymer or copolymer blocks of the monomers A, the polymer blocks P(A) each having a softening temperature in the range from +20° C. to +175° C., and where the polymer blocks P(B) independently at each occurrence represent homopolymer or copolymer blocks of the monomers B, the polymer blocks P(B) each having a softening temperature in the range from −130° C. to +10° C.

The block copolymers containing at least one polyfunctional branching unit X are also referred to below as star polymers. The star polymers can in this case be used alone or else in combination with linear branched, unbranched or otherwise-structured block copolymers C1 or C2 in the sense of component K1 or K2 respectively.

In one very preferred embodiment of the invention star polymers of type (II) are admixed in the sense of the block copolymer C2.

The structural unit P(A2)-X-P(A2) is to be interpreted as a unit P(A2) with a correspondingly higher chain length, so that C2 in turn contains the unit P(B2)-P(A2)-P(B2).

In the case of advantageous star polymers of this kind at least two of the n polymer arms [P(B2)-P(A2)] differ in chemical structure, chain length and/or the length of side chains. In particular it is possible with advantage for there to be n different polymer arms. It is likewise possible to use star polymers having n identical polymer arms.

Typical use concentrations for the inverse triblock copolymers C2 in the blend are up to 250 parts by weight per 100 parts by weight of the triblock copolymer C1, so that advantageously the ratio $V_m$ of the amount $m_{K2}$ of component K2 used in the blend to the amount $m_{K1}$ of component K1 used in the blend can be described by the relationship $V_m = m_{K2}/m_{K1} \leq 2.5$.

In a preferred development of the invention the homopolymer and/or copolymer composition of the polymer blocks P(A2) and/or P(B2) of the inverse block copolymer C2 is identical to that of the copolymer blocks P(A1) or P(B1), respectively, in the triblock copolymers C1.

It may also be advantageous, however, if this is not the case. In that instance the polymer blocks P(A2) and/or P(B2) of the inverse block copolymer C2 are preferably chosen so as to be compatible with the blocks P(A1) and P(B1) of the triblock copolymer C1 in the sense that, in the course of mixing, there is no phase separation or microphase separation in respect of the compatible polymer blocks and/or that this mixing does not lead to the above-described phase separation or microphase separation.

The average chain lengths $K_{L2}$ of the polymer blocks P(A2) and P(B2) respectively in the inverse triblock copolymer C2 is preferably chosen such that it does not exceed the average chain length $K_{L1}$ of the polymer block P(A1) or P(B1) of the triblock copolymer C1 with which it is preferentially compatible, and advantageously is 10% lower, very advantageously 20% lower than that length.

The polymer block P(B2) may also advantageously be chosen such that its length corresponds at most to half the length of the polymer block P(B1).

The polymer blocks P(A) as described in the main claim or in the advantageous embodiments can be polymer chains of a single variety of monomer from group G(A) or copolymers formed from monomers of different structures from group G(A). In particular it is possible to vary the monomers A used in their chemical structure and/or in their sidechain length. The polymer blocks therefore cover the range between fully homogeneous polymers, via polymers formed from monomers of the same chemical parent structure but differing in chain length, and polymers with the same number of carbons but differing in isomerism, through to randomly polymerized blocks of monomers of different length with different isomerism from group G(A). The same is true of the polymer blocks P(B) in respect of the monomers of group G(B).

The unit P(A)-P(B)-P(A) may be either symmetrical [corresponding to $P^1(A)$-P(B)-$P^2(A)$ where $P^1(A) = P^2(A)$] or asymmetric [corresponding, for instance, to the formula $P^3(A)$-P(B)-$P^4(A)$ where $P^3(A) \neq P^4(A)$, but where both $P^3(A)$ and $P^4(A)$ are each polymer blocks as defined for P(A)] in construction.

An advantageous configuration is one in which at least one block copolymer, preferably two or more or all of the block copolymers, have a symmetrical construction such that there are polymer blocks P(A) identical in chain length and/or in chemical structure and/or there are polymer blocks P(B) identical in chain length and/or in chemical structure. $P^3(A)$ and $P^4(A)$ may differ in particular in their chemical composition and/or their chain length. The same comments apply to the inverse triblock copolymers based on P(B)-P(A)-P(B), which may be present either also symmetrically or asymmetrically.

As monomers for the elastomer blocks P(B) it is advantageous to use acrylic monomers (the term includes the corrresponding methacrylic monomers). For this it is possible in principle to use all acrylic compounds which are familiar to the skilled worker and suitable for synthesizing polymers. It is preferred to choose monomers which, even in combination with one or more further monomers, produce polymer block P(B) glass transition temperatures of less than +10° C. Similar comments apply to the choice of vinyl monomers.

In order to obtain a polymer glass transition temperature, $T_g$, of ≦10° C., in accordance with the remarks above and those below, the monomers are very preferably selected such, and the quantitative composition of the monomer mixture advantageously chosen such, that in accordance with equation (G1) (in analogy to the Fox equation, cf. T. G. Fox, Bull. Am. Phys. Soc. 1 (1956) 123) the polymer attains the desired $T_g$ value.

$$\frac{1}{T_g} = \sum_i \frac{w_i}{T_{g,i}} \tag{G1}$$

In this equation i represents the serial number of the monomers used, $w_i$ the mass fraction of the respective monomer i (in % by weight), and $T_{g,i}$ the respective glass transition temperature of the homopolymer of the respective monomer i, in K.

The polymer blocks P(B) are advantageously prepared using from 75 to 100% by weight of acrylic and/or methacrylic acid derivatives of the general structure

$$CH_2=CH(R^1)(COOR^2) \tag{V}$$

where $R^1$=H or $CH_3$ and $R^2$=H or linear, branched or cyclic, saturated or unsaturated alkyl radicals having from 1 to 30, in particular from 4 to 18, carbon atoms and/or up to 25% by weight of vinyl compounds (V) which in favorable cases contain functional groups.

Acrylic monomers used with great preference in the sense of compound (V) as components for polymer blocks P(B) comprise acrylic and methacrylic esters having alkyl groups composed of from 4 to 18 carbon atoms. Specific examples of such compounds, without wishing to be restricted by this enumeration, include n-butyl acrylate, n-pentyl acrylate, n-hexyl acrylate, n-heptyl acrylate, n-octyl acrylate, n-nonyl acrylate, lauryl acrylate, stearyl acrylate, stearyl methacrylate, branched isomers thereof, such as 2-ethylhexyl acrylate and isooctyl acrylate, for example, and also cyclic monomers such as cyclohexyl acrylate or norbornyl acrylate and isobornyl acrylate, for example.

As an option, it is also possible to use vinyl monomers from the following groups as monomers defined as (V) for polymer blocks P(B): vinyl esters, vinyl ethers, vinyl halides, vinylidene halides, and also vinyl compounds which comprise aromatic cycles and heterocycles in a position. Here too, mention may be made, by way of example, of selected monomers which can be used in accordance with the invention: vinyl acetate, vinylformamide, vinylpyridine, ethyl vinyl ether, 2-ethylhexyl vinyl ether, butyl vinyl ether, vinyl chloride, vinylidene chloride, and acrylonitrile.

Particularly preferred examples of suitable vinyl-containing monomers defined as (V) for the elastomer blocks P(B) further include hydroxyethyl acrylate, hydroxypropyl acrylate, hydroxyethyl methacrylate, hydroxypropyl methacrylate, N-methylolacrylamide, acrylic acid, methacrylic acid, allyl alcohol, maleic anhydride, itaconic anhydride, itaconic acid, benzoin acrylate, acrylated benzophenone, acrylamide, and glycidyl methacrylate, to name but a few.

In one preferred embodiment of the inventive systems, one of or two or more of the polymer blocks contain(s) one or more grafted-on side chains. There is no restriction as to whether systems of this kind are obtained by a graft-from process (polymerizational attachment of a side chain starting from an existing polymer backbone) or by a graft-to process (attachment of polymer chains to a polymer backbone by means of polymer-analogous reactions).

For preparing block copolymers of this type it is possible in particular to use, as monomers B, monomers functionalized in such a way as to allow a graft-from process for the grafting on of side chains. Particular mention here is to be made of acrylic and methacrylic monomers which carry halogen functionalization or functionalization provided by any other functional groups which permit, for example, an ATRP (atom transfer radical polymerization) process. In this connection mention may also be made of the possibility of introducing side chains into the polymer chains in a targeted way by means of macromonomers. The macromonomers may in turn be constructed in accordance with the monomers B.

In one specific embodiment of this invention, the polymer blocks P(B) have had incorporated into them one or more functional groups which permit radiation-chemical crosslinking of the polymer blocks, in particular by means of UV irradiation or irradiation with rapid electrons. With this objective, monomer units which can be used include, in particular, acrylic esters containing an unsaturated alkyl radical having from 3 to 18 carbon atoms and at least one carbon-carbon double bond. Suitable acrylates modified with double bonds include, with particular advantage, allyl acrylate and acrylated cinnamates. In addition to acrylic monomers it is also possible with great advantage, as monomers for the polymer block P(B), to use vinyl compounds containing double bonds which are not reactive during the (radical) polymerization of the polymer block P(B). Particularly preferred examples of such comonomers are isoprene and/or butadiene, but also chloroprene.

Starting monomers for the polymer blocks P(A) are preferably selected such that the resulting polymer blocks P(A) are immiscible with the polymer blocks P(B) and, correspondingly, microphase separation occurs. Advantageous examples of compounds used as monomers A include vinylaromatics, which can also be alkylated, methyl methacrylate, cyclohexyl methacrylate, isobornyl methacrylate, and isobornyl acrylate. Particularly preferred examples are methyl methacrylate and styrene, although this enumeration makes no claim to completeness.

In addition, however, the polymer blocks P(A) may also be constructed in the form of a copolymer which can consist of at least 75% of the above monomers A, leading to a high softening temperature, or of a mixture of these monomers, but contains up to 25% of monomers B which result in a reduction in the softening temperature of the polymer block P(A). In this sense mention may be made, by way of example but not exclusively, of alkyl acrylates, which are defined in accordance with the structure (V) and the comments made in relation thereto.

For the polymer blocks P(A) as well the monomers are advantageously chosen so as to obtain the desired glass transition temperature in accordance with equation G1.

In another favorable embodiment of the inventive PSA, polymer blocks P(A) and/or P(B) are functionalized in such a way that a thermally initiated crosslinking can be accomplished. Crosslinkers which can be chosen favorably include epoxides, aziridines, isocyanates, polycarbodiimides, and metal chelates, to name but a few.

One preferred characteristic of the triblock and inverse triblock copolymers used for the PSA systems of the invention is that their molar mass $M_n$ is between 25 000 and 600 000 g/mol, preferably between 30 000 and 400 000 g/mol, with particular preference between 50 000 g/mol and 300 000 g/mol. The fraction of the polymer block or blocks P(A) is advantageously between 5 and 49 percent by weight of the respective triblock copolymer, preferably between 7.5 and 35 percent by weight, with particular preference between 10 and 30 percent by weight. The polydispersity of the triblock copolymers P(A)-P(B)-P(A) and P(B)-P(A)-P(B) is preferably less than 3, being the quotient D formed from the mass average $M_w$ and the number average $M_n$ of the molar mass distribution.

In accordance with the invention the polymer blocks P(A) and P(B) are incompatible (not homogeneously miscible with one another), so that an at least two-phase system is present. With particular preference microphase separation occurs in the blends of the invention. In this case, owing to the chemical bonds between the incompatible blocks, only limited separation can occur; the separating phases can only reach a limited size. Blocks of the same kind, however, can come together to form domains, and the size and nature of the domains can be influenced by way of the proportion of the blocks to one another.

The chain lengths of the polymer blocks P(A) and of the polymer blocks P(B), and also the ratio of the chain lengths of the polymer blocks P(A) to those of the polymer blocks P(B) for the triblock copolymer P(A)-P(B)-P(A), are chosen, in a very advantageous procedure, in such a way that the block copolymers P(A) are present as a disperse phase (domains) in a continuous matrix of the polymer blocks P(B). This is preferably the case at a polymer block P(A) content of less than about 25% by weight. The domains may preferably be present in spherical or distortedly spherical form. The formation of hexagonally packed cylindrical domains of the polymer blocks P(A) is likewise possible within the sense of the invention.

In another embodiment the aim is for asymmetric design of the triblock copolymers P(A)-P(B)-P(A) and/or P(B)-P(A)-P(B), the lengths of the terminal polymer blocks P(A) in linear systems being different.

In one version which is particularly preferred inventively the molecular weight $M_n$ (number average) of the middle block P(B) is limited to $M_n$=250 000 g/mol for the triblock copolymer P(A)-P(B)-P(A), in order to make it easier to coat the PSA from the melt. In another inventively preferred version the molecular weight $M_n$ of the inverse triblock copolymer is less than or equal to that of the triblock copolymer P(A)-P(B)-P(A).

Furthermore, it can be advantageous to add diblock copolymers of type P(A)-P(B) to the aforementioned blend of triblock copolymer and inverse triblock copolymer, in which case the same monomers as above can be used for preparing the corresponding polymer blocks P(A) and P(B). Moreover, it can be of advantage to add polymers P'(A) and/or P'(B) to the PSA composed of the triblock copolymers P(A)-P(B)-P(A) and P(B)-P(A)-P(B), with or without admixing of one or more diblock copolymers, in order to improve its properties.

Accordingly a further embodiment of the invention relates to a blend of at least one triblock copolymer C1 and at least one inverse triblock copolymer C2 corresponding to the remarks made above,
comprising at least one diblock copolymer C3 of the general form P(A3)-P(B3),
  wherein the polymer blocks P(A3) (of the individual diblock copolymers) independently of one another represent homopolymer or copolymer blocks of the monomers A, the polymer blocks P(A3) each having a softening temperature in the range from +20° C. to +175° C.,
  and wherein the polymer blocks P(B3) (of the individual diblock copolymers) independently of one another represent homopolymer or copolymer blocks of the monomers B3, the polymer blocks P(B3) each having a softening temperature in the range from −130° C. to +10° C.,
and/or comprising at least one polymer P'(A4) and/or P'(B4),
  wherein the polymers P'(A4) represent homopolymers and/or copolymers of the monomers A4, the polymers P'(A4) each having a softening temperature in the range from +20° C. to +175° C.,
  wherein the polymers P'(B4) represent homopolymers and/or copolymers of the monomers B, the polymers P'(B4) each having a softening temperature in the range from −130° C. to +10° C.,
  and wherein the polymers P'(A4) and/or P'(B4) are preferably miscible with the polymer blocks P(A4) and/or P(B4), respectively.

Where both polymers P'(A4) and polymers P'(B4) are admixed, they are advantageously chosen such that the polymers P'(A4) and P'(B4) are not homogeneously miscible with one another.

As monomers for the diblock copolymers P(A3)-P(B3), and, respectively, the polymers P'(A4) and P'(B4) it is preferred to use the monomers already mentioned of groups G(A) and G(B) respectively.

At least one and preferably two or more or all the diblock copolymers preferably exhibit a molar mass $M_n$ of between 5000 and 600 000 g/mol, more preferably between 15 000 and 400 000 g/mol, with particular preference between 30 000 and 300 000 g/mol. They advantageously possess a polydispersity $D=M_w/M_n$ of not more than 3. It is advantageous if the fraction of the polymer blocks P(A) in relation to the composition of the diblock copolymer is between 3 and 50% by weight, preferably between 5 and 35% by weight. The diblock copolymers too may advantageously have one or more grafted-on side chains.

Typical concentrations in which diblock copolymers are used in the blend are up to 250 parts by weight per 100 parts by weight of the triblock copolymer/inverse triblock copolymer mixture. The polymer blocks P(A3) and/or P(B3) of the diblock copolymers C3 can be constructed as homopolymer blocks and also as copolymer blocks. In accordance with the comments made above they are advantageously chosen so as to be compatible with the block copolymers P(A1) and/or P(B1) of the triblock copolymers C1 and/or with the block copolymers P(A2) and/or P(B2), respectively, of the inverse triblock copolymers C2.

The chain length of the polymer blocks P(A3) and P(B3) respectively is preferably chosen so that it does not exceed that of the polymer block with which it is preferably compatible (miscible), and is advantageously 10% lower, very advantageously 20% lower, than said length. The blocks P(B3) can with advantage also be chosen such that their respective length does not exceed half of the average length of the blocks P(B1) and/or P(B2) of the triblock copolymers C1 and/or C2, respectively.

Similar comments apply to the polymers P'(A4) and P'(B4) respectively. These polymers can be constructed as homopolymers and also as copolymers. In accordance with the comments made earlier on above they are advantageously chosen such that they are compatible with the blocks P(A1) and/or P(A2) and/or P(B1) and/or P(B2), respectively, of the triblock copolymers C1 and C2, respectively, and/or with the blocks P(A3) and/or P(B3) of the diblock copolymers C3. The chain length of the polymers P'(A4) and P'(B4), respectively, is preferably chosen such that it does not exceed that of the polymer block with which it is preferably compatible (miscible), and is advantageously 10% lower, very advantageously 20% lower, than said length.

To prepare the triblock copolymers C1 and C2 and, for the case of the inventive version, the diblocks C3 it is possible in principle to use all polymerizations which proceed in accordance with a controlled or living mechanism, including combinations of different controlled polymerization techniques. Without possessing any claim to completeness, mention may be made here, by way of example, besides anionic polymerization, of ATRP, nitroxide/TEMPO-controlled polymerization, or, more preferably, the RAFT process; in other words, particularly processes which allow control over the block lengths, polymer architecture, or else, but not necessarily, the tacticity of the polymer chain.

Radical polymerizations can be conducted in the presence of an organic solvent or in the presence of water or in mixtures of organic solvents and/or organic solvents with water, or without solvent. It is preferred to use as little solvent as possible. Depending on conversion and temperature, the polymerization time for radical processes is typically between 4 and 72 h.

In the case of solution polymerization, the solvents used are preferably esters of saturated carboxylic acids (such as ethyl acetate), aliphatic hydrocarbons (such as n-hexane, n-heptane or cyclohexane), ketones (such as acetone or methyl ethyl ketone), special boiling point spirit, aromatic solvents such as toluene or xylene, or mixtures of the aforementioned solvents. For polymerization in aqueous media or in mixtures of organic and aqueous solvents, it is preferred to add emulsifiers and stabilizers for the polymerization. If a method of radical polymerization is chosen, then as polymerization initiators it is of advantage to use customary radical-forming compounds such as, for example, peroxides, azo compounds, and peroxosulfates. Initiator mixtures also possess outstanding suitability.

In an advantageous procedure, radical stabilization is effected using nitroxides of type (VIa) or (VIb):

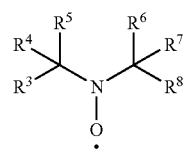

(VIa)

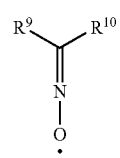

(VIb)

where $R^3$, $R^4$, $R^5$, $R^6$, $R^7$, $R^8$, $R^9$, and $R^{10}$ independently of one another denote the following compounds or atoms:

i) halides, such as chlorine, bromine or iodine ii) linear, branched, cyclic, and heterocyclic hydrocarbons having from 1 to 20 carbon atoms, which can be saturated, unsaturated or aromatic, iii) esters —COOR$^{11}$, alkoxides —OR$^{12}$ and/or phosphonates —PO(OR$^{13}$)$_2$, in which $R^{11}$, $R^{12}$, and $R^{13}$ stand for radicals from group ii).

Compounds of (VIa) or (VIb) may also be attached to polymer chains of any kind (primarily in the sense that at least one of the abovementioned radicals constitutes such a polymer chain) and can therefore be used as macroradicals or macroregulators to construct the block copolymers.

More preferred are controlled regulators for the polymerization of compounds of the type:

2,2,5,5-tetramethyl-1-pyrrolidinyloxyl (PROXYL), 3-carbamoyl-PROXYL, 2,2-dimethyl-4,5-cyclohexyl-PROXYL, 3-oxo-PROXYL, 3-hydroxylimine-PROXYL, 3-aminomethyl-PROXYL, 3-methoxy-PROXYL, 3-t-butyl-PROXYL, 3,4-di-t-butyl-PROXYL 2,2,6,6-tetramethyl-1-piperidinyloxy pyrrolidinyloxyl (TEMPO), 4-benzoyloxy-TEMPO, 4-methoxy-TEMPO, 4-chloro-TEMPO, 4-hydroxy-TEMPO, 4-oxo-TEMPO, 4-amino-TEMPO, 2,2,6,6-tetraethyl-1-piperidinyloxyl, 2,2,6-trimethyl-6-ethyl-1-piperidinyloxyl N-tert-butyl 1-phenyl-2-methylpropyl nitroxide N-tert-butyl 1-(2-naphthyl)-2-methylpropyl nitroxide N-tert-butyl 1-diethylphosphono-2,2-dimethylpropyl nitroxide N-tert-butyl 1-dibenzylphosphono-2,2-dimethylpropyl nitroxide N-(1-phenyl-2-methylpropyl) 1-diethylphosphono-1-methylethyl nitroxide di-t-butyl nitroxide diphenyl nitroxide t-butyl t-amyl nitroxide A series of further polymerization methods by which the block copolymers may be prepared in an alternative procedure may be chosen from the state of the art: U.S. Pat. No. 4,581,429 A discloses a controlled-growth radical polymerization process initiated using a compound of the formula R'R"N—O—Y in which Y is a free radical species which is able to polymerize unsaturated monomers. The reactions, however, generally have low conversions. A particular problem is the polymerization of acrylates, which proceeds only to very low yields and molar masses. WO 98/13392 A1 describes open-chain alkoxyamine compounds which have a symmetrical substitution pattern. EP 735 052 A1 discloses a process for preparing thermoplastic elastomers having narrow molar mass distributions. WO 96/24620 A1 describes a polymerization process using very specific radical compounds such as, for example, phosphorus-containing nitroxides which are based on imidazolidine. WO 98/44008 A1 discloses specific nitroxyls based on morpholines, piperazinones, and piperazinediones. DE 199 49 352 A1 describes heterocyclic alkoxyamines as regulators in controlled-growth radical polymerizations. Corresponding further developments of the alkoxyamines and/or of the corresponding free nitroxides improve the efficiency for preparing polyacrylates (Hawker, contribution to the National Meeting of the American Chemical Society, Spring 1997; Husemann, contribution to the IUPAC World Polymer Meeting 1998, Gold Coast).

As a further controlled polymerization method, it is possible advantageously to use atom transfer radical polymerization (ATRP) to synthesize the block copolymers, with preferably monofunctional or difunctional secondary or tertiary halides being used as initiator and, to abstract the halide(s), complexes of Cu, Ni, Fe, Pd, Pt, Ru, Os, Rh, Co, Ir, Ag or Au (EP 0 824 111 A1; EP 826 698 A1; EP 824 110 A1; EP 841 346 A1; EP 850 957 A1). The different possibilities of ATRP are also described in the documents U.S. Pat. Nos. 5,945,491 A, 5,854,364 A, and 5,789,487 A.

It is also possible with advantage to prepare the block copolymer used in accordance with the invention by means of an anionic polymerization. In this case the reaction medium used preferably comprises inert solvents, such as aliphatic and cycloaliphatic hydrocarbons, for example, or else aromatic hydrocarbons.

The living polymer is generally represented by the structure $P_L(A)$-Me, in which Me is a metal from group I of the Periodic Table, such as lithium, sodium or potassium, for example, and $P_L(A)$ is a growing polymer block made up of the monomers A. The molar mass of the polymer block being prepared is determined by the ratio of initiator concentration to monomer concentration. In order to construct the block structure for the triblock copolymer P(A)-P(B)-P(A), first of all the monomers A are added for the construction of a polymer block P(A), then, by adding the monomers B, a polymer block P(B) is attached, and subsequently, by again adding monomers A, a further polymer block P(A) is polymerized on. Alternatively, P(A)-P(B)-M can be coupled by means of a suitable difunctional compound. In this way, starblock copolymers $(P(B)-P(A))_n$ as well are obtainable.

In order to construct the block structure for the inverse triblock coplymer P(B)-P(A)-P(B), first of all the monomers B are added for the construction of a polymer block P(B), then, by adding the monomers A, a polymer block P(A) is attached, and subsequently, by again adding monomers B, a further polymer block P(B) is polymerized on. Alternatively, P(B)-P(A)-M can be coupled by means of a suitable difunctional compound. In this way, starblock copolymers $(P(A)-P(B))_n$ as well are obtainable.

Examples of suitable polymerization initiators include n-propyllithium, n-butyllithium, sec-butyllithium, 2-naphthyllithium, cyclohexyllithium, and octyllithium, but this enumeration makes no claim to completeness. Furthermore, initiators based on samarium complexes are known for the polymerization of acrylates (Macromolecules, 1995, 28, 7886).

It is also possible, moreover, to use difunctional initiators, such as 1,1,4,4-tetraphenyl-1,4-dilithiobutane or 1,1,4,4-tetraphenyl-1,4-dilithioisobutane. Coinitiators may likewise be used. Suitable coinitiators include lithium halides, alkali metal alkoxides, and alkylaluminum compounds. In one very preferred version, the ligands and coinitiators are chosen so that acrylate monomers, such as n-butyl acrylate and 2-ethylhexyl acrylate, for example, can be polymerized directly and do not have to be generated in the polymer by transesterification with the corresponding alcohol.

A very preferred preparation process conducted is a variant of the RAFT polymerization (reversible addition-fragmentation chain transfer polymerization). The polymerization process is described in detail, for example, in the documents WO 98/01478 A1 and WO 99/31144 A1. Suitable with particular advantage for the preparation of triblock copolymers are trithiocarbonates of the general structure R'''-S-C(S)-S-R''' (Macromolecules 2000, 33, 243-245), by means of which for preparing triblock copolymers P(A)-P(B)-P(A), in a first step, monomers for the end blocks P(A) are polymerized. Then, in a second step, the middle block P(B) is synthesized. Following the polymerization of the end blocks P(A), the reaction can be terminated and reinitiated. It is also possible to carry out polymerization sequentially without interrupting the reaction.

For preparing inverse triblock copolymers P(B)-P(A)-P(B), in a first step, monomers for the end blocks P(B) are polymerized. Then, in a second step, the middle block P(A) is synthesized. Following the polymerization of the end blocks P(B), the reaction can be terminated and reinitiated. It is also possible to carry out polymerization sequentially without interrupting the reaction.

In one very advantageous variant, for example, the trithiocarbonates (VII) and (VIII) or the thio compounds (IX) and (X) are used for the polymerization, it being possible for φ to be a phenyl ring, which can be unfunctionalized or functionalized by alkyl or aryl substituents attached directly or via ester or ether bridges, or to be a cyano group or a saturated or unsaturated aliphatic radical. The phenyl ring φ may optionally carry one or more polymer blocks, examples being polybutadiene, polyisoprene, polychloroprene or poly(meth)acrylate, which can be constructed in accordance with the definition of P(A) or P(B), or polystyrene, to name but a few. Functionalizations may, for example, be halogens, hydroxyl groups, epoxide groups, groups containing nitrogen or sulfur, without this list making any claim to completeness.

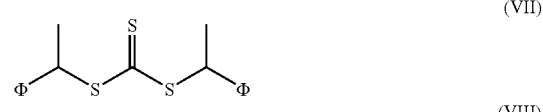

(VII)

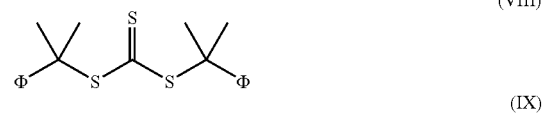

(VIII)

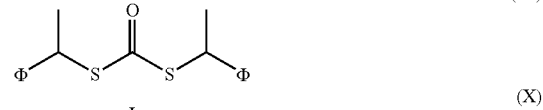

(IX)

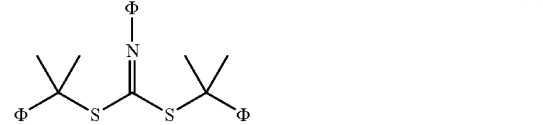

(X)

It is also possible to employ thioesters of the general structure $R^{IV}\text{-C(S)-S-}R^V$, especially in order to prepare asymmetric systems. $R^{IV}$ and $R^V$ can be selected independently of one another, and $R^{IV}$ can be a radical from one of the following groups i) to iv) and $R^V$ a radical from one of the following groups i) to iii):

i) $C_1$ to $C_{18}$ alkyl, $C_2$ to $C_{18}$ alkenyl, $C_2$ to $C_{18}$ alkynyl, each linear or branched; aryl-, phenyl-, benzyl-, aliphatic and aromatic heterocycles.

ii) $-NH_2$, $-NH-R^{VI}$, $-NR^{VI}R^{VII}$, $-NH-C(O)-R^{VI}$, $-NR^{VI}-CO(O)-R^{VII}$, $-NH-C(S)-R^{VI}$, $-NR^{VI}-C(S)-R^{VII}$,

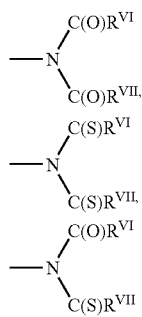

with $R^{VI}$ and $R^{VII}$ being radicals selected independently of one another from group i).

iii) $-S-R^{VIII}$, $-S-C(S)-R^{VIII}$, with $R^{VIII}$ being able to be a radical from one of groups i) or ii).

iv) $-O-R^{VIII}$, $-O-C(O)-R^{VIII}$, with $R^{VIII}$ being able to be a radical chosen from one of the groups i) or ii).

In connection with the abovementioned polymerizations which proceed by controlled radical mechanisms, it is preferred to use initiator systems which further comprise additional radical initiators for the polymerization, especially thermally decomposing radical-forming azo or peroxo initiators. In principle, however, all customary initiators known for acrylates are suitable for this purpose. The production of C-centered radicals is described in Houben-Weyl, Methoden der Organischen Chemie, Vol. E19a, p. 60 ff. These methods are employed preferentially. Examples of radical sources are peroxides, hydroperoxides, and azo compounds. A few non-exclusive examples of typical radical initiators that may be mentioned here include potassium peroxodisulfate, dibenzoyl peroxide, cumene hydroperoxide, cyclohexanone peroxide, cyclohexylsulfonyl acetyl peroxide, di-tert-butyl peroxide, azodiisobutyronitrile, diisopropyl percarbonate, tert-butyl peroctoate, and benzpinacol. In one very preferred variant, the radical initiator used is 1,1'-azobis(cyclohexylnitrile) (Vazo 88®, DuPont®) or 2,2-azobis(2-methylbutanenitrile) (Vazo 67®, DuPont®). Furthermore, it is also possible to use radical sources which release radicals only under UV irradiation.

In the conventional RAFT process, polymerization is generally carried out only to low conversions (WO 98/01478 A1), in order to obtain very narrow molecular weight distributions. Because of the low conversions, however, these polymers cannot be used as pressure-sensitive adhesives and particularly not as hotmelt pressure-sensitive adhesives, since the high residual monomer fraction adversely affects the adhesive technological properties, the residual monomers contaminate the solvent recyclate in the concentration process, and the corresponding self-adhesive tapes would exhibit very high outgassing. One possible way out here is reinitiation (PCT/EP01/06734)

In accordance with the invention the solvent is stripped off preferably in a concentrative extruder under reduced pressure, it being possible to use, for example, single-screw or twin-screw extruders for this purpose, which preferentially distill off the solvent in different or the same vacuum stages and which possess a feed preheater.

For inventive further development, particularly for the PSA utility, tackifier resins may be admixed to the triblock copolymer-containing blends. In principle, it is possible to use all resins soluble in the corresponding elastomer block P(B). Suitable tackifier resins include rosin and rosin derivatives (rosin esters, including rosin derivatives stabilized by, for example, disproportionation or hydrogenation), polyterpene resins, terpene-phenolic resins, alkylphenol resins, and aliphatic, aromatic and aliphatic-aromatic hydrocarbon resins, to name but a few. Primarily, the resins chosen are those which are compatible preferentially with the elastomer block. The weight fraction of the resins in the block copolymer is typically up to 40% by weight, more preferably up to 30% by weight. For one special kind of the implementation of the invention it is also possible to use resins which are compatible with the polymer block P(A).

It is also possible, optionally, to add plasticizers, fillers (e.g., fibers, carbon black, zinc oxide, titanium dioxide, chalk, solid or hollow glass beads, microbeads of other materials, silica, silicates), nucleators, expandants, compounding agents and/or aging inhibitors, in the form of primary and secondary antioxidants or in the form of light stabilizers, for example.

The internal strength (cohesion) of the blends, particularly for the PSA utility, is preferably produced by physical crosslinking via the polymer blocks P(A). The resulting physical crosslinking is typically thermoreversible. For irreversible crosslinking, the blends may additionally be crosslinked chemically. For this purpose, the acrylic block copolymer-containing blends can optionally comprise compatible crosslinking substances. Examples of suitable crosslinkers include metal chelates, polyfunctional isocyanates, polyfunctional amines, and polyfunctional alcohols. Additionally, polyfunctional acrylates can be used with advantage as crosslinkers for actinic radiation.

For the optional crosslinking with UV light, UV-absorbing photoinitiators are added to the polyacrylate-containing block copolymers employed in the systems of the invention. Useful photoinitiators which can be used to great effect are benzoin ethers, such as benzoin methyl ether and benzoin isopropyl ether, for example, substituted acetophenones, such as 2,2-diethoxyacetophenone (available as Irgacure 651® from Ciba Geigy®), 2,2-dimethoxy-2-phenyl-1-phenylethanone, dimethoxyhydroxy-acetophenone, substituted α-ketols, such as 2-methoxy-2-hydroxypropiophenone, aromatic sulfonyl chlorides, such as 2-naphthylsulfonyl chloride, and photoactive oximes, such as 1-phenyl-1,2-propanedione 2-(O-ethoxycarbonyl) oxime.

The abovementioned photoinitiators and others which can be used, including those of the Norrish I or Norrish II type, can contain the following radicals: benzophenone, acetophenone, benzil, benzoin, hydroxyalkylphenone, phenyl cyclohexyl ketone, anthraquinone, trimethylbenzoylphosphine oxide, methylthiophenyl morpholinyl ketone, aminoketone, azobenzoin, thioxanthone, hexarylbisimidazole, triazine or fluorenone, it being possible for each of these radicals to be further substituted by one or more halogen atoms and/or one or more alkyloxy groups and/or one or more amino groups or hydroxyl groups. A representative overview is given by Fouassier: "Photoinitiation, Photopolymerization and Photocuring: Fundamentals and Applications", Hanser-Verlag, Munich 1995. For further details, consult Carroy et al. in "Chemistry and Technology of UV and EB Formulation for Coatings, Inks and Paints", Oldring (ed.), 1994, SITA, London.

One advantageous use of the blend of the invention as a PSA is its use for producing acrylic PSA tapes. For this purpose the blend is coated onto a backing. Suitable backing material includes in principle BOPP, PET, nonwoven, PVC, metal foils, foam or release papers (glassine, HDPE, LDPE). Coating takes place from solution or from the melt.

For coating from the melt the solvent is therefore preferably stripped off in a concentrating extruder under reduced pressure, for which purpose it is possible, for example, to use single-screw or twin-screw extruders, which preferably distill off the solvent in different or equal vacuum stages and which possess a feed preheater.

Coating takes place advantageously through a melt die or through an extrusion die onto a backing material, the orientation being produced by stretching of the PSA tape film. Extrusion coating takes place preferably through an extrusion die. Extrusion dies can be subdivided into three categories: T-dies, fishtail dies, and coathanger dies. The individual types differ in the design of their flow channel.

The block copolymer blends can be used outstandingly for producing orientated block copolymer PSAs. For this purpose coating takes place, preferably using a coathanger die, onto a backing, specifically such that a layer of polymer is produced on the backing by a movement of die relative to backing. In the case of extrusion die coating, the slot width of the die at the exit is greater than the layer thickness of the coated PSA film. Orientation therefore comes about as a result of stretching. The orientation of the PSA is retained after coating by virtue of the self-organization of the PSA: that is, a physical network is formed of hard block domains P(A). Similarly, orientation of acrylic block copolymer PSAs can also be produced by melt die coating.

The measurement of the orientation of the adhesive can be made using a polarimeter, using infrared dichroism or using X-ray scattering. A further method, which is particularly preferred, is the measurement of the shrinkback in the free film. These measurement methods are described in detail in the experimental test methods section (see DE 101 56 088.5).

Where the blends are additionally crosslinked, crosslinking can take place, for example, by brief UV irradiation in the range from 200 to 400 nm using standard commercial high or medium pressure mercury lamps with an output, for example, of from 80 to 240 W/cm or by thermal crosslinking in a temperature range between 70 to 104° C. For UV crosslinking it may be appropriate to adapt the lamp output to the web speed or to shade off the web partly, with the belt running slowly, in order to reduce the thermal load on the web. The exposure time is governed by the construction and output of the respective lamps.

In principle it is also possible to crosslink the blends after coating, using electron beams. Typical irradiation devices which may be employed are linear cathode systems, scanner systems, and segmented cathode systems, in the case of electron beam accelerators. A detailed description of the state of the art, and the most important process parameters, can be found in Skelhorne, Electron Beam Processing, in Chemistry and Technology of UV and EB Formulation for Coatings, Inks and Paints, Vol. 1, 1991, SITA, London. The typical acceleration voltages are situated within the range between 50 kV and 500 kV, preferably between 80 kV and 300 kV. The radiation doses used range between 5 to 150 kGy, in particular between 20 and 100 kGy.

The invention further provides for the use of the blends of the invention as pressure-sensitive adhesives for producing single-sided and double-sided pressure-sensitive adhesive tapes and also for transfer tapes.

Exemplary product structures for PSA systems produced with the blends of the invention may be advantageous:

PSA systems with a single-layer product structure, the layer being composed of a PSA as described above;

PSA systems with a multilayer product structure, especially a two-layer or three-layer product structure, where at least one of the layers is composed of a PSA as described above and preferably has a thickness of at least 10 µm, more preferably at least 25 µm, and where preferably one of the other layers is composed of an elastomer;

PSA systems comprising at least one backing or carrier layer.

In order to produce strippable systems it is possible for the PSA tapes to have the following construction in particular:

a] single-layer adhesive sheets composed of a PSA layer comprising as its base polymer a triblock copolymer blend of the invention.

b] multilayer adhesive sheets comprising as PSA layer on one or both sides one or more triblock copolymer blends of the invention.

It is of particular advantage for the strippable systems of the invention if the pressure-sensitive adhesive has a breaking elongation of at least 300% and a tensile strength of at least 3 MPa (for test methods see DE 101 29 608.8).

EXPERIMENTS

The following test methods were used to evaluate the technical adhesive properties of the PSA systems produced.

Test Methods

180° Bond Strength Test (Test A)

A strip 20 mm wide of a PSA coated onto siliconized release paper was transferred by lamination to a PET film, 25 µm thick and provided with a Saran primer, and then this PSA tape specimen was applied to a steel plate. The PSA strip was pressed down twice onto the substrate using a 2 kg weight. The adhesive tape was then immediately removed from the substrate at 30 mm/min and at an angle of 180°. The steel plates were washed twice with acetone and once with isopropanol. The results are reported in N/cm and are averaged from three measurements. All measurements were conducted at room temperature under standardized climatic conditions.

Gel Permeation Chromatography (GPC) (Test B)

The average molecular weights $M_n$ (number average) and $M_w$ (weight average) and the polydispersity D were determined by gel permeation chromatography. The eluent used was THF containing 0.1% by volume trifluoroacetic acid. Measurement was carried out at 25° C. The precolumn used was PSS-SDV, 5µ, $10^3$ Å, ID 8.0 mm×50 mm. Separation was carried out using the columns PSS-SDV, 5µ, $10^3$ and $10^5$ and $10^6$ each of ID 8.0 mm×300 mm. The sample concentration was 4 g/l, the flow rate 1.0 ml per minute. Measurement was made against polystyrene standards.

Shear Stability Times (Test C)

Testing was carried out in accordance with PSTC-7. A 50 µm layer of pressure-sensitive adhesive is applied to a 25 µm PET film. A strip of this sample 1.3 cm wide is bonded to a polished steel plate over a length of 2 cm, by rolling over it back and forth three times using a 2 kg roller. The plates are equilibrated for 30 minutes under test conditions (temperature and humidity) but without loading. Then the test weight is hung on, exerting a shearing stress parallel to the bond surface, and the time taken for the bond to fail is measured. If a holding time of 10 000 minutes is reached, the test is discontinued before the adhesive bond fails.

Production of Test Specimens
Preparation of a RAFT Regulator:

The bis-2,2'-phenylethyl trithiocarbonate regulator was prepared starting from 2-phenylethyl bromide using carbon disulfide and sodium hydroxide in accordance with a set of instructions in Synth. Comm., 1988, 18 (13), 1531. Yield 72%. $^1$H NMR (CDCl$_3$), δ: 7.20-7.40 ppm (m, 10 H); 3.81 ppm (m, 1 H); 3.71 ppm (m, 1 H); 1.59 ppm (d, 3 H); 1.53 ppm (d, 3 H).

Preparation of the Triblock Copolymers P(A)-P(B)-P(A):
Preparation of Polystyrene (PS1):

A 2 L reactor conventional for free-radical polymerization is charged under nitrogen with 362 g of styrene and 3.64 g of bis-2,2'-phenylethyl trithiocarbonate regulator. This initial charge is heated to an internal temperature of 110° C. and initiated with 0.15 g of Vazo 67® (DuPont). After a reaction time of 10 hours 100 g of toluene are added. After a reaction time of 24 hours a further 0.1 g of Vazo 67® is added for initiation and polymerization is continued for 24 hours. During the polymerization there is a marked rise in the viscosity. To compensate this, 150 g of toluene are added as a final dilution after 48 hours. The polymer is purified by precipitation from 4.5 liters of methanol, filtration on a frit, and subsequent drying in a vacuum drying cabinet.

The result of carrying out gel permeation chromatography (Test B) against polystyrene standards was $M_n$=29 300 g/mol and $M_w$=35 500 g/mol.

Preparation of Polystyrene (PS2):

A 2 L reactor conventional for free-radical polymerization is charged under nitrogen with 1500 g of styrene and 9.80 g of bis-2,2'-phenylethyl trithiocarbonate regulator. This initial charge is heated to an internal temperature of 120° C. and initiated with 0.1 g of Vazo 67® (DuPont). After a reaction time of 24 hours 200 g of toluene are added and a further 0.1 g of Vazo 67® is added for initiation. After a reaction time of 36 hours a further 200 g of toluene are added. During the polymerization there is a marked rise in the viscosity. After 48 hours the polymerization is discontinued.

The polymer is purified by precipitation from 4.5 liters of methanol, filtration on a frit, and subsequent drying in a vacuum drying cabinet.

The result of carrying out gel permeation chromatography (Test B) against polystyrene standards was $M_{=36\ 100}$ g/mol and $M_w$=44 800 g/mol.

Triblock Copolymer P(A)-P(B)-P(A) (T1)

A reactor conventional for free-radical polymerizations was charged with 44.7 g of trithiocarbonate-functionalized polystyrene (PS1), 442 g of 2-ethylhexyl acrylate, 35 g of acrylic acid and 0.12 g of Vazo 67™ (DuPont). After argon had been passed through for 20 minutes and the reactor had been degassed twice it was heated to 70° C. with stirring, polymerization was carried out for 24 hours, and then initiation was repeated with 0.1 g of Vazo 67® (DuPont). After the end of the polymerization, after 48 hours, the solvent was removed in a vacuum drying cabinet at 50° C. and 10 mm pressure, by cooling to room temperature, in order to isolate the hot melt. The result of carrying out gel permeation chromatography (Test B) against polystyrene standards was $M_n$=104 700 g/mol and $M_w$=204 100 g/mol.

Triblock Copolymer (P(A)-P(B)-P(A) (T2)

A reactor conventional for free-radical polymerizations was charged with 45.9 g of trithiocarbonate-functionalized polystyrene (PS1), 442 g of 2-ethylhexyl acrylate, 17 g of acrylic acid and 0.12 g of Vazo 67™ (DuPont). After argon had been passed through for 20 minutes and the reactor had been degassed twice it was heated to 70° C. with stirring, polymerization was carried out for 24 hours, and then initiation was repeated with 0.1 g of Vazo 67® (DuPont). After the end of the polymerization, after 48 hours, the solvent was removed in a vacuum drying cabinet at 50° C. and 10 mm pressure, by cooling to room temperature, in order to isolate the hot melt. The result of carrying out gel permeation chromatography (Test B) against polystyrene standards was $M_n$=90 900 g/mol and $M_w$=182 000 g/mol.

Triblock copolymer P(A)-P(B)-P(A) (T3)

A reactor conventional for free-radical polymerizations was charged with 700 g of trithiocarbonate-functionalized polystyrene (PS2), 3063 g of n-butyl acrylate and 1600 g of acetone. With stirring and under nitrogen gas the reactor was heated to an internal temperature of 65° C. and 0.1 g of Vazo 67™ (DuPont) was added. The reactor was heated to 70° C. with stirring and the batch was polymerized for 24 hours, and then initiation was repeated with 0.1 g of Vazo 67® (DuPont). After the end of the polymerization, after 48 hours, the solvent was removed in a vacuum drying cabinet at 50° C. and 10 mm pressure, by cooling to room temperature, in order to isolate the hot melt. The result of carrying out gel permeation chromatography (Test B) against polystyrene standards was $M_n$=111 300 g/mol and $M_w$=197 000 g/mol.

The abovementioned triblock copolymers were used both as mixing components and as reference substances. For adhesive assessment these polymers were coated from solution onto a Saren-primed PET film 25 μm thick and were subsequently freed from solvent in a drying cabinet. The application rate was 50 g/m$^2$ in each case. For adhesive assessment test methods A and C were carried out.

Preparation of the Inverse Criblock Copolymers P(B)-P(A)-P(B):
Triblock Copolymer P(B)-P(A)-P(B) (IT1):

A 2000 ml Schlenk vessel was charged with 800 g of 2-ethylhexyl acrylate, 63 g of acrylic acid, 400 ml of acetone, 0.64 g of bis-2,2'-phenylethyl trithiocarbonate and 0.12 g of Vazo 67™ (DuPont), the vessel was degassed three times and then the polymerization was carried out under argon. For initiation the mixture was heated to 60° C. and polymerized with stirring for 8 hours. Then solvent and the remaining monomers were separated off by vacuum distillation and 150 ml of toluene and 86.3 g of styrene were added. After a further 24 hours' reaction time at 90° C. initiation was repeated using 0.1 g of Vazo 67™ (DuPont) and after 48 h, for isolation, the mixture was cooled to RT and the polymer was dissolved in 800 ml of dichloromethane and then precipitated from 8.0 L of methanol (cooled to −78° C.) with vigorous stirring. The precipitate was filtered off over a cooled frit and then analyzed by GPC ($M_n$=90 200 g/mol, $M_{w/n}$=1.92).

Triblock Copolymer P(B)-P(A)-P(B) (IT2):

A 2000 ml Schlenk vessel was charged with 800 g of 2-ethylhexyl acrylate, 30.8 g of acrylic acid, 400 ml of acetone, 0.64 g of bis-2,2'-phenylethyl trithiocarbonate and 0.12 g of Vazo 67™ (DuPont), the vessel was degassed three times and then the polymerization was carried out under argon. For initiation the mixture was heated to 60° C. and polymerized with stirring for 8 hours. Then solvent and the remaining monomers were separated off by vacuum distillation and 150 ml of toluene and 83.8 g of styrene were added. After a further 24 hours' reaction time at 90° C. initiation was repeated using 0.1 g of Vazo 67™ (DuPont) and after 48 h, for isolation, the mixture was cooled to RT and the polymer was dissolved in 800 ml of dichloromethane and then precipitated from 8.0 L of methanol (cooled to −78° C.) with vigorous stirring. The precipitate was filtered off over a cooled frit and then analyzed by GPC ($M_n$=82 400 g/mol, $M_{w/n}$=1.85).

Triblock Copolymer P(B)-P(A)-P(B) (IT3):

A 2000 ml Schlenk vessel was charged with 800 g of n-butyl acrylate, 400 ml of toluene, 0.64 g of bis-2,2'-phenylethyl trithiocarbonate and 0.12 g of Vazo 67™ (DuPont), the vessel was degassed three times and then the polymerization was carried out under argon. For initiation the mixture was heated to 60° C. and polymerized with stirring for 8 hours. Then solvent and the remaining monomers were separated off by vacuum distillation and 250 ml of toluene and 120 g of styrene were added. After a further 24 hours' reaction time at 90° C. initiation was repeated using 0.1 g of Vazo 67™ (DuPont) and after 48 h, for isolation, the mixture was cooled to RT and the polymer was dissolved in 800 ml of dichloromethane and then precipitated from 8.0 L of methanol (cooled to −78° C.) with vigorous stirring. The precipitate was filtered off over a cooled frit and then analyzed by GPC ($M_n$=98 400 g/mol, $M_{w/n}$=1.81).

Preparation of the Polymer Blends from P(A)-P(B)-P(A) and P(B)-P(A)-P(B):

General Instructions:

The solvent-freed triblock copolymers P(A)-P(B)-P(A) and P(B)-P(A)-P(B) were combined in the corresponding proportions and subsequently a 30% strength solution in toluene was prepared. For adhesive assessment these polymers were coated from solution to a Saran-primed PET film 25 μm thick and then freed from solvent in a drying cabinet. The application rate was 50 g/m² in each case. Adhesive assessment was carried out using test methods A and C.

Example 1

To 100 g of P(A)-P(B)-P(A) (T1) there were added 30 g of P(B)-P(A)-P(B) (IT1).

Example 2

To 100 g of P(A)-P(B)-P(A) (T2) there were added 30 g of P(B)-P(A)-P(B) (IT2).

Example 3

To 100 g of P(A)-P(B)-P(A) (T3) there were added 30 g of P(B)-P(A)-P(B) (IT3).

Example 4

To 100 g of P(A)-P(B)-P(A) (T3) there were added 20 g of P(B)-P(A)-P(B) (IT3).

Example 5

To 100 g of P(A)-P(B)-P(A) (T3) there were added 40 g of P(B)-P(A)-P(B) (IT3).

Preparation of the Polymer Blends from P(A)-P(B)-P(A) and P(B):

Reference Example R1

To 100 g of P(A)-P(B)-P(A) (T3) there were added 40 g of polybutyl acrylate having an average molecular weight $M_w$=210 000 g/mol und $M_{w/n}$=3.42 (see test B) and this mixture was compounded.

Results

To test the process of the invention first of all a number of conventional triblock copolymers of the P(A)-P(B)-P(A) type were prepared. The polymers prepared differ in their middle block composition and in the fraction of the end blocks P(B). In order to assess the effects of polymer blending of conventional triblock copolymers and inverse triblock copolymers the technical adhesive properties of the reference substances (P(A)-P(B)-P(A) triblock copolymers) were determined first of all. The results are shown in table 1.

TABLE 1

(Reference substances)

| Triblock copolymers P(A)-P(B)-P(A) | BS-steel [N/cm] | SST 10 N RT [min] |
|---|---|---|
| T1 | 5.1 | +10 000 |
| T2 | 3.8 | +10 000 |
| T3 | 3.6 | +10 000 |

BS: Bond strength to steel
SST: Shear stability times at room temperature under 10 N load 50 g/m² application rate From table 1 it is apparent that the bond strength is dependent on the composition of the middle block. Furthermore, all triblock copolymers have a very high cohesion, as is apparent from the shear stability times of more than 10 000 minutes.

For the process of the invention different polymer blends were prepared (examples 1-5). The admixed inverse triblock copolymers possess approximately the same comonomer composition of P(A) and P(B), but differ in the molecular weight of the individual blocks. Generally speaking, the inverse triblock copolymers possess a somewhat lower average molecular weight. First of all 30 g of each inverse triblock copolymer were added. In addition, however, a variation in the proportions was undertaken with examples 3-5. In order to quantify the effects of polymer blending, the technical adhesive tests were carried out again. The results are summarized in table 2.

TABLE 2

| Examples | BS-steel [N/cm] | SST 10 N RT [min] |
|---|---|---|
| 1 | 5.8 | +10 000 |
| 2 | 4.5 | +10 000 |
| 3 | 4.4 | +10 000 |
| 4 | 4.0 | +10 000 |
| 5 | 5.1 | +10 000 |
| R1 | 5.7 | 1345 |

BS: Bond strength to steel
SST: Shear stability times at room temperature under 10 N load 50 g/m² Application rate From examples 1-5 it has been demonstrated that as a result of the addition of the inverse triblock copolymers P(B)-P(A)-P(B) an increase in the bond strength was obtained in all cases. Moreover, the adhesive retained its good cohesion in all cases. Reference example 1 was included initially since, for example, the addition of a polymer of identical composition to P(B) of the triblock copolymer P(A)-P(B)-P(A) could represent a further way of increasing bond strength. This does actually work, but in this case the PSA R1 loses its cohesion. This phenomenon is known for numerous additives which increase the bond strength. In the case of the polymer blends of the invention the cohesion is retained. All of the polymer blends were transparent, indicating effective miscibility.

We claim:

1. A blend of at least two components K1 and K2, each component being based on at least one block copolymer C1 or C2 respectively, the at least one block copolymer C1 of component K1 consisting of one or more units of P(A1)-P(B1)-P(A1), where P(A1) independently at each occurrence represents homopolymer or copolymer blocks of monomers A1, the polymer blocks P(A1) each having a softening temperature in the range from +20° C. to +175° C., P(B1) represents a homopolymer or copolymer block of monomers B1, the polymer block P(B1) having a softening temperature in the range from −130° C. to +10° C., the polymer blocks P(A1) and P(B1) are not homogeneously miscible with one another, the at least one block copolymer C2 of component K2 consisting of one or more units of P(B2)-P(A2)-P(B2), where P(A2) represents a homopolymer or copolymer block of monomers A2, the polymer block P(A2) having a softening temperature in the range from +20° C. to +175° C., P(B2) independently at each occurrence represents homopolymer or copolymer blocks of monomers B2, the polymer blocks P(B2) each having a softening temperature in the range from −130° C. to +10° C., the polymer blocks P(A2) and P(B2) are not homogeneously miscible with one another, wherein the polymer blocks P(A1) and the polymer blocks P(A2) possess an identical homopolymer and/or copolymer composition and the polymer blocks P(B1) and the polymer blocks P(B2) possess an identical homopolymer and/or copolymer composition and the blend forming an at least two-phase system.

2. The blend of claim 1, wherein component K1 is present in an amount $m_{K1}$ and component K2 is present in an amount $m_{K2}$, and the amount $m_{K2}$ of component K2 used in the blend to the amount $m_{K1}$ of component K1 used in the blend is up to 250 parts by weight of K2 per 100 parts by weight of K1 to produce a ratio $V=m_{K2}/m_{K1} \leq 2.5$.

3. The blend of claim 1, wherein the blocks P(A1) are compatible with the blocks P(A2) and/or their respective corresponding polymers P'(A1) with P'(A2) and/or the blocks P(B1) are compatible with the blocks P(B2) and/or their respective corresponding polymers P'(B1) with P'(B2).

4. The blend of claim 1, wherein the average chain length LB2 of the polymer blocks P(B2) of the block copolymer C2 does not exceed the average chain length LB1 of the polymer block P(B1) of the block copolymer C1.

5. The blend of claim 1, wherein, with the symbol i representing 1 or 2, the polymer blocks P(Ai) are present as a disperse phase in a continuous matrix of the polymer blocks P(Bi), optionally as spherical or distortedly spherical domains, this condition being obtained by adjustment of the ratio $V_{Li}$ of the average chain lengths LAi of the polymer blocks P(Ai) to the average chain lengths LBi of the polymer blocks P(Bi).

6. The blend claim 1, wherein the block copolymer C1 has:
a number average molecular weight $M_n$ of between 10,000 and 600,000 g/mol,
a polydispersity $D=M_w/M_n$ of not more than 3,
a polymer block P(A1) fraction of between 5 and 49% by weight based on the composition-of the block copolymer C1.

7. The blend of claim 1, further comprising
at least one diblock copolymer C3 of the general formula P(A3)-P(B3), wherein the polymer blocks P(A3) independently of one another represent homopolymer or copolymer blocks of the monomers A3, the polymer blocks P(A3) each having a softening temperature in the range from +20° C. to +175° C., and wherein the polymer blocks P(B3) independently of one another represent homopolymer or copolymer blocks of the monomers B3, the polymer blocks P(B3) each having a softening temperature in the range from −130° C. to +10° C., and/or further comprising at least one polymer P'(A4) and/or P'(B4), wherein the polymers P'(A4) represent homopolymers and/or copolymers of the monomers A4, the polymers P'(A4) each having a softening temperature in the range from +20° C. to +175° C., wherein the polymers P'(B4) represent homopolymers and/or copolymers of the monomers B4, the polymers P'(B4) each having a softening temperature in the range from −130° C. to +10° C., and wherein optionally the polymers P(A4) are miscible with the polymer blocks P(A1), P(A2) and/or P(A3) and/or the polymers P'(A4) are miscible with the polymer blocks P(B1), P(B2) and/or P(B3).

8. The blend of claim 7, wherein the diblock copolymer has:
a molar mass $M_n$ of between 5000 and 600 000 g/mol,
a polydispersity $D=M_w/M_n$ of not more than 3,
a polymer block P(A3) fraction of between 3 and 50% by weight, based on the diblock copolymer composition.

9. The blend of claim 1, wherein, with the symbol i representing 1 or 2, the polymer blocks P(Bi) are selected from the group consisting of group (1) acrylic and methacrylic acid derivatives of the structure (VI)

$$CH_2=CH(R^1)(COOR^2) \qquad (VI)$$

where $R^1$=H or $CH_3$ and $R^2$=H or linear, branched or cyclic, saturated or unsaturated carbon chains having from 1 to 30 carbon atoms, group (2) vinyl compounds which optionally contain functional groups.

10. The blend of claim 9, wherein the polymer blocks P(Bi) represent a copolymer of from 75 to 100% by weight of monomers from group (1) and up to 25% by weight of monomers from group (2), the weight fractions adding up to 100.

11. The blend of claim 1, further comprising
an admixture of tackifier resins, at a weight fraction of up to 40% by weight based on the weight of the blend without said resins,
and/or an admixture of plasticizers, fillers, nucleators, expandants, compounding agents and/or aging inhibitors.

12. The blend of claim 1, wherein said blend is processed further from the melt and is applied to a backing.

13. A pressure-sensitive adhesive tape having a pressure sensitive adhesive comprising the blend of claim 1, the pressure-sensitive adhesive being present as a single-sided or double-sided film on a backing.

14. The blend of claim 4, wherein LB2 is at least 10% smaller than LB1.

15. The blend of claim 14, wherein LB2 is at least 20% smaller than LB1.

* * * * *